ably in commercial operation a solvent would be used to take the solid ternary compound into solution and the aromatic-free paraffin stream could be decanted from the solution and further cleansed of the solvent by distillation.

United States Patent Office 3,467,725
Patented Sept. 16, 1969

3,467,725
SEPARATION OF AROMATIC HYDROCARBONS WITH SOLID TERNARY COMPOUNDS
David G. Walker, Baytown, Tex., assignor to Humble Oil & Refining Company, Houston, Tex., a corporation of Delaware
No Drawing. Continuation of application Ser. No. 689,725, Dec. 11, 1967, which is a continuation of application Ser. No. 242,365, Dec. 5, 1962. This application Nov. 1, 1968, Ser. No. 776,306
Int. Cl. C07c 15/00, 7/02
U.S. Cl. 260—674                    8 Claims

ABSTRACT OF THE DISCLOSURE

In a method for separating aromatic constituents from an admixture with paraffinic and naphthenic constituents in a hydrocarbon stream, a solid binary compound selected from the group having the general formula:

$$M^{+n}(AlX_4)_n{}^{-1}$$

where M is $Cu^{+1}$, $Ag^{+1}$, $Zn^{+2}$, $Cd^{+2}$, $Hg^{+2}$, $Sn^{+2}$, and $Pb^{+2}$; X is Cl and Br; and $n$ is the valence of the metal, is admixed with the hydrocarbon stream to form a solid ternary compound with the aromatic constituents such that the solid ternary compound may be separated from the paraffinic and naphthenic constituents in the hydrocarbon stream.

---

This application is a continuation of application Ser. No. 689,725 filed Dec. 11, 1967, now abandoned, which in turn is a continuation of Ser. No. 242,365, filed Dec. 5, 1962, now abandoned.

The present invention is directed to stable ternary addition compounds. More particularly, the invention is concerned with ternary addition compounds which exist and can be isolated as solids at room temperatures. In its more specific aspects, the invention is concerned with the separation of aromatic constituents from their admixture with paraffinic and naphthenic constituents.

The present invention may be briefly described as compositions of matter having the general formula:

$$M^n(Aromatic)(AlX_4)_n$$

where M is $Li^{+1}$, $Cu^{+1}$, $Ag^{+1}$, $Au^{+1}$, $Zn^{+2}$, $Cd^{+2}$, $Hg^{+2}$, $Sn^{+2}$, $Pb^{+2}$, and $Sb^{+3}$; Aromatic is a single-ring aromatic compound having 6 to 12 carbon atoms in the molecule; X is either Cl or Br; and $n$ is the valence of the metal. These solid ternary compounds possess the useful property wherein the aromatic behaves like a solid solution with the metal and the $(AlX_4)^-$ parts of the solid. Further, the aromatic compounds can be quantitatively removed in fractions by raising the temperature of the ternary compounds under partial vacuum from 25° C. to 200° C.

It is known in the art to treat oils with various selective solvents in order to segregate the oils into their more paraffinic constituents and their more aromatic constituents. For commercial solvent treating processes it has been difficult to find a solvent which is entirely suitable in all respects. An ideal solvent is one which will make a clear separation between the aromatic and the paraffinic constituents of the oil and which will also extract substantially the entire quantity of aromatic constituents present. However, as a practical matter, in commercial solvent treating processes of the prior art the only way to obtain substantially complete separations is by staged or successive separations since no ideal solvent exists.

According to one aspect of the present invention, a complete separation between the aromatic constituents and the paraffinic and naphthenic constituents of an oil may be obtained. This separation is brought about essentially by the formation of the compositions of matter of the present invention.

The ternary addition compounds of the present invention may be prepared by fusing a chloride or bromide salt of lithium, copper, silver, gold, zinc, cadmium, mercury, tin or lead with a stoichiometrical amount of aluminum chloride or bromide to produce a binary compound. The fused binary compound is heated to 400° C. in a vacuum to sublime off any aluminum halide which will distill at that temperature. This resulting binary compound has a formula $M^{+n}(AlX_4)_n{}^{-1}$ where M is the metal and X the halide. The resulting binary compounds are then stirred in the presence of aromatic compounds. Upon warming to about 60° C. to 80° C., the production of the addition compounds of the present invention will take place much more rapidly. The addition reaction to produce the ternary addition compounds of the present invention is stoichiometric in nature, and accordingly, by using a slight excess of the binary compound will produce a clean separation in a single separation step when the aromatic compounds are admixed with paraffinic or naphthenic constituents. The ternary addition compounds of the present invention complex and precipitate as solids and are separable by mechanical means.

The metal portion of the ternary addition compounds of the present invention are found in Groups I, II, IV and V of the Periodic Table. However, it is to be noted that a generalization as to the groups cannot be made since all alkali and alkaline earth metals do not form the ternary addition compounds of the present invention. As set forth heretofore, the metals which form stable ternary addition compounds of the present invention are lithium, copper, silver, gold, zinc, cadmium, mercury, tin, lead and antimony. In the Group I and II metals sodium, potassium and magnesium will not form a stable ternary addition compound which can be isolated as a solid at room temperature. However, solubility studies of sodium aluminum tetrachloride, potassium aluminum tetrachloride, magnesium aluminum chloride do show an abnormally high solubility of these compounds in aromatic solvents, and accordingly, some complexing might occur.

The present invention should be further distinguished from the known liquid complexes of aromatics with aluminum chloride. These known complexes may be set forth as $(Aromatic-H)^{+1}(Al_2Cl_7)^{-1}$ or $$(Aromatic-H)^{+1}(AlCl_4)^{-1}$$

It should be pointed out that these complexes are ternary compounds which may be separated and isolated but do not exist as solids. However, upon the dearomatization or the regeneration of the components making up these complexes by heating or other known methods, substantial breakdown occurs of the aromatic especially, and a quantitative recovery of the aromatic portion is impossible. Likewise, it should be pointed out that these known complexes which are formed by the addition reaction of HCl, $Al_2Cl_6$ and an aromatic will in all probability be formed when a metal halide and water are present since the hydrolysis of the metal halide will form the HCl required to produce the liquid complex.

The ternary addition compounds of the present invention are useful intermediates in separation processes wherein aromatic constituents are separated from their admixture with paraffinic and naphthenic constituents in a hydrocarbon stream. Illustrative of such a separation process is the cleaning of a normal paraffin stream to obtain the normal paraffins in extremely high purities. The separation of the aromatics may be accomplished by adding the binary compounds, $M^{+n}(AlX_4)_n{}^{-1}$, formed by fusing the metal halide with a stoichiometrical amount of aluminum halide as set forth heretofore to the paraffin stream. It is to be noted that a stable binary compound of antimony does not exist, although the ternary compounds of the present invention have been found. The binary compound is added in a slight excess as a solid, and the ternary compounds of the present invention are formed as solids. The liquid phase containing the n-paraffins is separated in one step from the solids by mechanical means, such as a filter. By raising the temperature in excess of 25° C. under partial vacuum, the aromatic is recovered quantitatively from the solid ternary addition compounds of the present invention and the solid binary compound results. Rather then mixing the binary compound with the paraffin stream, the paraffin stream may be passed through a fixed bed of the binary compound to remove aromatics present in the stream. Thus, the binary compounds disclosed and the ternary addition compounds of the present invention have characteristics analogous to ion-exchange resins. The fixed bed is periodically regenerated by heating under a partial vacuum whereby the aromatic compounds would be removed. The normal paraffin treated in the manner just described would be suitable for use in biodegradable products, and the purity would be extremely high.

The present invention will be further described by the following examples of the preparation of the ternary addition compounds of the present invention.

Example I 0.171 (g.-mol) $Al_2Cl_6$ was mixed with 0.192 (g.-mol) $PbCl_2$ was heated with a Bunsen burner inside a tube until complete melting occurred. The melt was crystallized as a layer on the walls of the tube by rotating the tube as it cooled. 0.380 (mol) m-xylene was added and shaken for four days on an automatic shaker.

Only about 4–5 ml. of liquid was left, while a new white crystalline solid had appeared which was distinctly different from solid $Pb(AlCl_4)_2$. This new solid was filtered under $N_2$ atmosphere and washed thoroughly three times with cyclohexane. The solid was left two hours at 25° C. in a vacuum to volatize any occluded hydrocarbon material. The solid burns with a smoky flame leaving much non-flammable residue.

Analysis, wt. percent.—Calc. for Pb(m-xylene)$(AlCl_4)_2$: Pb, 31.9; Al, 8.3; Cl, 43.5; m-xylene, 16.3. Found: Pb, 30.5; Al, 9.4; Cl, 42.2; m-xylene, 10.2.[a]

Example II

Silver chloride (0.1395 mol) and aluminum chloride (0.1395 mol $AlCl_3$) were fused together under nitrogen. The melt was spread over the walls of a glass reactor and allowed to solidify. 65 ml. of benzene was then added and refluxed for three hours under an $N_2$ blanket. After filtration, the solution was cooled under an $N_2$ blanket whereupon a large portion of white crystalline material crystallized. The solid was filtered off and subjected to vacuum drying at 25° C. for three hours to yield the product. The product burns with a smoky flame with much non-flammable residue.

Analysis, wt. percent.—Calc. of Ag(benzene)$AlCl_4$: Al, 7.6; Ag, 30.5; Cl, 40.1; benzene, 22.0. Found: Al, 8.4; Ag, 30.3; Cl, 42.8; benzene, 18.7 (difference).

The foregoing examples are only illustrative of the preparation of the ternary addition compounds of the present invention. All except the antimony ternary compound can be prepared by first forming the fused binary metal halide and aluminum halide compounds. The chloride is merely the preferred halide of the present invention. The preferred metals are copper, silver, tin and lead. It is to be further noted that while the examples set forth a single aromatic compound so as to prove the compounds of the present invention, the binary compounds may be mixed with a mixture of $C_6$ to $C_{12}$ aromatics, and the ternary addition compounds of the present invention will be formed. The aromatic compounds may then be quantitatively removed in fractions by raising the temperature of the ternary compounds under partial vacuum from about 25° C. to 200° C.

The nature and objects of the present invention having been completely described and illustrated, what I wish to claim as new and useful and secure by Letters Patent is:

1. A method for separating $C_6$ to $C_{12}$ aromatic constituents from an admixture with paraffinic and naphthenic constituents in the hydrocarbon stream comprising contacting said hydrocarbon stream with a binary compound selected from the group having the general formula:

$$M^{+n}(AlX_4)_n^{-1}$$

where M is $Cu^{+1}$, $Ag^{+1}$, $Au^{+1}$, $Zn^{+2}$, $Cd^{+2}$, $Hg^{+2}$, $Sn^{+2}$, and $Pb^{+2}$; X is Cl and Br; and $n$ is the valence of the metal and forming a solid ternary compound having the following formula:

$$M^n (Aromatic)(AlX_4)_n$$

and separating said solid ternary compound from said paraffinic and napthenic constituents.

2. A method according to claim 1 wherein said pure binary compound is solid.

3. A method in accordance with claim 1 wherein said binary compound is $Cu(AlCl_4)$.

4. A method in accordance with claim 1 wherein said binary compound is $Ag(AlCl_4)$.

5. A method in accordance with claim 1 wherein said binary compound is $Sn(AlCl_4)_2$.

6. A method in accordance with claim 1 wherein said binary compound is $Pb(AlCl_4)_2$.

7. A method in accordance with claim 1 wherein said aromatic constituent is recovered from said solid ternary compound by vacuum distillation.

8. A method for separating $C_6$ to $C_{12}$ aromatic constituents from an admixture in a hydrocarbon stream comprising passing said hydrocarbon stream through a solid bed of binary compound selected from the group having the general formula:

$$M^{+n}(AlX_4)_n^{-1}$$

where M is $Cu^{+1}$, $Ag^{+1}$, $Au^{+1}$, $Zn^{+2}$, $Cd^{+2}$, $Hg^{+2}$, $Sn^{+2}$, and $Pb^{+2}$; X is Cl and Br; and $n$ is the valence of the metal, whereby the solid bed of the binary compound becomes a solid bed of a ternary compound having the following formula:

$$M^n (Aromatic)(AlX_4)_n$$

and a raffinate is formed of said paraffinic and napthenic constituents.

References Cited

UNITED STATES PATENTS

| | | | |
|---|---|---|---|
| 2,481,843 | 9/1949 | Holt et al. | 260—674 |
| 2,810,002 | 10/1957 | Scott et al. | 260—674 |

OTHER REFERENCES

Plotnikov et al.: Chemical Abstracts, volume 28, column 6119, 1934.

DELBERT E. GANTZ, Primary Examiner

C. E. SPRESSER, Assistant Examiner

U.S. Cl. X.R.

23—205; 260—448, 666, 676

---

[a] Quantitative yield not obtained. Sample was hydrolyzed and all hydrocarbon liquid possible collected. Infrared spectra showed only traces of hydrocarbons present other than m-xylene.